United States Patent Office.

WILLIAM A. HORRALL, OF WASHINGTON, INDIANA, ASSIGNOR, BY DIRECT AND MESNE ASSIGNMENTS, TO HENRY H. HYATT, OF SAME PLACE.

PROCESS OF TREATING WOOD AND FIBER.

SPECIFICATION forming part of Letters Patent No. 443,238, dated December 23, 1890.

Application filed September 26, 1889. Serial No. 325,218. (No specimens.)

*To all whom it may concern:*

Be it known that I, WILLIAM A. HORRALL, a citizen of the United States, residing at Washington, in the county of Daviess and State of Indiana, have invented a new and useful Process of Treating Wood and Fiber, of which the following is a specification.

The invention relates to improvements in processes of treating wood and fiber.

The object of the present invention is to separate the fiber for the manufacture of rope and the like and to adapt the residue for the manufacture of paper.

To carry the invention into effect a tank is filled with soft water, and then is added alcohol or its equivalent of whisky or other spirits in proportion of one pint to every one hundred gallons of water, then sugar or its equivalent of molasses in proportion to one pound to the same amount of water, and then one ounce of nitric or sulphuric acid is added, and all the ingredients are thoroughly mixed.

The entire plant, which is preferably of the mallow family, is placed in the tank containing the liquid and weighed down, and then the temperature of the liquid is raised by steam or similar means to about 96° and retained at that temperature until fermentation subsides and disintegration is complete, which will require from ten to twelve days. The alcohol and sugar or molasses cause fermentation to set in immediately and hasten complete disintegration of the wood and fiber. The plant is then taken from the liquid and the fiber removed from the inside stock and washed in soft water, and it is then ready for making rope, twine, paper, or similar articles. The stock or woody part is then cut or macerated and put in a tightly-covered tank and subjected to the action of steam until it is thoroughly cleansed, which will require from two to four hours, according to the quantity being treated.

When it is desired to prepare the entire material for paper-making, the outside fibers should not be separated from the stock or woody part; but it should all be treated as above described—that is, subjected to the action of steam after fermentation—when it will be ready for the pulp and paper mills.

The plant contains a large amount of gum and gluten and starch, and during the process of fermentation the gum and gluten are dissolved and the starch is broken up, alcohol and acetic acid resulting from the chemical action and leaving the fiber perfectly clean.

What I claim is—

1. The process of treating wood and fiber, consisting in subjecting the plant to a liquid composed of soft water, alcohol, sugar, and a suitable acid in the proportion described until fermentation subsides and disintegration is complete, and washing, substantially as described.

2. The process herein described, consisting in subjecting the plant to a liquid composed of water, alcohol, sugar, and a suitable acid, maintaining the liquid at a temperature of about 96° until fermentation subsides and disintegration is complete, and washing, substantially as described.

3. The process of treating wood and fiber, consisting in subjecting the plants to a liquid composed of soft water, alcohol, sugar, and a suitable acid until fermentation subsides and disintegration is complete, washing, and then subjecting to the action of steam, substantially as described.

In testimony that I claim the foregoing as my own I have hereto affixed my signature in presence of two witnesses.

WILLIAM A. HORRALL.

Witnesses:
 HIRAM HYATT,
 HUGH BARR.